United States Patent [19]

Ingram et al.

[11] 4,385,156
[45] May 24, 1983

[54] PROCESS FOR PRODUCING COATED STYRENIC POLYMER BEADS FOR HEAT RESISTANT FOAMS

[75] Inventors: Alvin R. Ingram, West Chester; Harold A. Wright, Murrysville, both of Pa.; Walter O. Pillar, New Hartford, N.Y.; Adolph V. DiGiulio, Wayne; Kenneth D. Thom, North Braddock, both of Pa.

[73] Assignee: Atlantic Richfield Company, Los Angeles, Calif.

[21] Appl. No.: 364,297

[22] Filed: Apr. 1, 1982

[51] Int. Cl.³ .............. C08F 212/08; C08F 220/06; C08L 25/08; C08J 9/16
[52] U.S. Cl. .............................. 525/253; 525/255; 525/261; 525/301; 521/56; 521/57; 521/59; 521/60; 427/222; 428/407
[58] Field of Search ............ 525/253, 301; 521/59, 521/60

[56] References Cited

U.S. PATENT DOCUMENTS

| | | | |
|---|---|---|---|
| 3,047,534 | 7/1962 | Dyer et al. | 525/253 |
| 3,786,115 | 1/1974 | Osuga et al. | 525/253 |
| 3,839,308 | 10/1974 | Carrock | 260/88.1 |
| 4,091,054 | 5/1978 | Saito et al. | 525/253 |

*Primary Examiner*—Carman J. Seccuro
*Attorney, Agent, or Firm*—Lewis J. Young

[57] ABSTRACT

Styrenic polymer expandable beads that are useful in forming heat-resistant foamed articles are prepared by forming an aqueous suspension of initial styrenic polymer beads and adding thereto a portion of a comonomer solution of styrenic monomer and methacrylic acid, which solution also contains a polymerization regulator, forming an emulsion of catalyst, monomer solution and polyvinyl alcohol suspending agent, adding portions of the emulsion to the suspension and then adding the remainder of the comonomer solution to the suspension, and the suspension with added monomers is heated to copolymerize the styrenic monomer and methacrylic acid about the initial beads and form a coating about the beads.

10 Claims, No Drawings

PROCESS FOR PRODUCING COATED STYRENIC POLYMER BEADS FOR HEAT RESISTANT FOAMS

The present invention is directed to a process for forming styrenic polymer beads that form foams having high heat resistance. Such high heat resistant foams are useful, for example, in situations where moldable, rigid, light-weight foams are desired having stability at temperatures in the range of 110°–115° C. An example of such usage would be in automotive industry applications, when light-weight but heat stable foams can be used, with a resultant reduction in fuel consumption, in the interiors of automobiles.

The formation of styrenic polymer beads by an aqueous suspension process is a well known and commercial practice. Such production is generally effected by the suspension polymerization of a styrenic monomer in an aqueous medium with an oil-soluble polymerization catalyst, using a suspending system comprising of a finely divided, difficultly water-soluble inorganic phosphate, such as tricalcium phosphate, in conjunction with an anionic surface-active agent, such as sodium dodecylbenzene sulfonate, as a modifier. Such suspension polymerization systems are described, for example, in Grim U.S. Pat. No. 2,673,194, the contents of said patent being incorporated by reference herein. Such styrenic polymer beads are made expandable by impregnation with a suitable blowing agent.

Polystyrene beads, upon formation of foams therefrom do not, however, have the stability required at higher temperatures, for example, temperatures in the range of 110°–115° C. required for certain uses. The formation of various copolymers to increase the heat resistance has been proposed.

U.S. Pat. No. 3,839,308 describes the production of styrenic polymers of improved heat resistance by the suspension copolymerization of styrene with methacrylic acid. However, conventional methods of suspension polymerization produce an excessive amount of fine beads, particularly finer than about 30-mesh. These fine bead particles are of little or no value as expandable beads for the molding of foam articles with a wall thickness greater than 0.25 inch.

U.S. Pat. No. 4,091,054 teaches that prescreened styrenic polymer beads can be uniformly enlarged, with the formation of negligible by-product powder, by polymerizing or copolymerizing styrenic monomers thereon, provided 60–100% of the suspension polymerization catalyst is first deposited on the beads from an aqueous suspension of a solution of the catalyst in the monomer or comonomers. This patent teaches styrene homopolymers and styrene copolymers containing up to 50% by weight of styrene derivatives, acrylonitrile, and esters of unsaturated acids (e.g. methyl methacrylate). However, our attempts to prepare copolymers of styrene and methacrylic acid according to the teachings of this patent resulted in suspension instability.

An object of the present invention is to produce styrenic polymer beads having a coating of a copolymer of styrenic monomer and methacrylic acid formed thereabout and to convert the beads to beads that will mold to foams having heat resistance superior to that of conventional polystyrene foams.

Another object of the invention is to minimize the production of beads finer than the openings of a 30-mesh sieve.

BRIEF SUMMARY OF THE INVENTION

A process for forming coated styrenic polymer beads for use in producing heat-resistant foamed articles, comprises forming a suspension of styrenic polymer beads in an aqueous medium with the aid of a finely divided, difficulty water-soluble inorganic phosphate suspending agent and a polyvinyl alcohol suspending agent, forming a solution of a styrenic monomer, methacrylic acid and a polymerization regulator, forming an aqueous catalyst emulsion containing a minor portion of the solution, a polyvinyl alcohol suspending agent and a styrenic monomer-soluble free-radical-producing catalyst, and adding said emulsion to the aqueous suspension and then adding the remainder of the solution, optionally having additional catalyst dissolved therein, to the aqueous suspension and polymerizing the styrenic monomer and methacrylic acid to form a coating thereof about the styrenic polymer beads.

DETAILED-DESCRIPTION OF THE INVENTION

The present process provides a means for forming heat-resistant styrenic polymer foams by forming a polymerized coating of a styrenic monomer and methacrylic acid about styrenic polymer beads.

The styrenic polymer beads are diffused to some extend with the comonomers that are initially added. Thus, the term "coating" as used in this invention does not imply a distinct separation of layers between the initial styrenic polymer beads and the methacrylic acid copolymer formed thereon.

The term "styrenic" as used herein is intended to include styrene, alpha-methylstyrene, para-methylstyrene, para-t-butylstyrene, monochlorostyrene and dichlorostyrene, as well as mixtures thereof, or such styrenic polymer beads containing at least 50 per cent of a styrenic moiety and other ethylenically unsaturated monomers, when used in conjunction with the styrenic polymer beads or styrenic monomer. The formation of styrenic polymer initial beads is according to known processes and the present invention is directed to a process for forming heat resistant styrenic polymer beads by coating on such initial beads a copolymer of styrenic monomer and methacrylic acid.

The initial styrenic polymer beads are formed into a suspension in an aqueous medium by dispersing the beads in water, containing a finely divided, difficultly water-soluble, inorganic phosphate suspending agent such as those described in Grum U.S. Pat. No. 2,673,194, and include tricalcium phosphate, hydroxyapatite, magnesium phosphate, and the like. The amount of such suspension agent added is about 2.5–4.0 percent by weight of the final product, with about 3 percent by weight preferred. In addition to the finely divided, difficultly water-soluble, inorganic phosphate suspending agent, there is added a polyvinyl alcohol suspending agent, such as is sold under the trademark "Vinol 540", in an amount of about 0.07–0.30 percent by weight, with a preferred amount of about 0.10 percent, based on the final product weight.

There is also prepared a solution of styrene monomer, methacrylic acid and a polymerization regulator. This solution is to be divided into at least two minor portions and a major portion, which portions are added sequentially to the aqueous suspension of styrenic polymer beads.

The polymerization chain transfer regulator used to reduce the molecular weight is selected from the long chain mercaptans, with normal-dodecylmercaptan or tertiary-dodecylmercaptan being especially useful, which mercaptan is added to the solution in an amount of about 0.01 to 0.10 percent of the styrenic monomer-methacrylic acid mixture.

The amount of styrenic monomer and methacrylic acid present in the solution will depend upon the amount of the coating to be formed about the initial styrenic beads but should be such that the final beads produced comprise 3 to 20 percent by weight of the initial styrenic polymer beads and 80 to 97 percent by weight of the coating. The coating itself should be formed from a mixture of styrenic monomer and methacrylic acid such that the coating is formed from 83 to 95 by weight styrenic monomer and 5 to 17 percent by weight of methacryclic acid.

The suspension of beads is heated between 60°-75° C., preferably 70° C., and an emulsion, stabilized by polyvinyl alcohol, of a minor amount of the comonomer solution is added thereto. This addition of comonomer solution will soften the beads in the suspension. Another minor portion of the solution is then added directly to the reaction vessel and the suspension examined to assure that the monomer-softened beads are not adhering together.

Another minor portion of the solution of styrenic monomer, methacrylic acid and polymerization regulator is admixed with the polymerization catalysts to form a concentrated solution thereof. This concentrated solution is then converted to an emulsion with the addition thereto of aqueous polyvinyl alcohol. The catalysts are a mixture of at least two free-radical peroxidic type materials comprising a primary low-temperature initiator having a 10-hour half-life temperature of between 60° and 80° C. and a secondary high-temperature initiator having a 10-hour half-life temperature of between 95° and 110° C. Thus, a mixture of benzoyl peroxide and t-butyl perbenzoate which have 10-hour half-life temperatures of 73° and 105° C., respectively, can be used.

The aqueous catalyst emulstion, so produced, is slowly added to the aqueous suspension of monomer-softened styrenic polymer beads over a period of about 0.25-1.0 hour, while heating the suspension with stirring, at a temperature of about 70° C. and maintaining that temperature during the addition. The suspension is then heated from about 70° C. to about 90° C., with stirring, during a period of about 1-1.5 hours.

The major portion of the solution of styrenic monomer, methacrylic acid, and polymerization regulator is next added to the mixture, with the addition being effected during a period of about 4.0-5.0 hours, and while the mixture is maintained at a polymerization temperature of about 90° C., with stirring.

When the proportion of initial styrenic polymer beads is low (especially below about 15-20% of the combined weight of beads and coating), additional catalysts may be added later by solution in a portion of the comonomer solution. These additional catalysts avoid the formation of excessively high molecular weight copolymer in the final stages of polymerization. Such high molecular weight copolymer causes the formation of a crust of high-density foam on the surface of expanded beads. Foam moldings, so produced, retain an excessive amount of hydrocarbon blowing agent which causes the foams to post-expand at about 115° C. The delayed addition of catalysts thus avoids the post-expansion of the foams.

The suspension is then further heated, with stirring, at about 90° C. for a sufficient time period, such as three to six hours, so as to reduce the content of unpolymerized monomers to less than about 2%. The suspension is then heated further, such as for four hours at 115° C. or one hour at 135° C., to reduce the amount of unpolymerized monomers to less than 0.25%, preferably less than 0.15%.

As examples of the present process, the following were carried out.

EXAMPLE I

A series of examples was carried out as follows. An initial polystyrene bead slurry was prepared in a 2-liter reaction kettle having an agitator, reflux condenser, combination baffle/thermometer wells and a monomer feed port, by adding thereto 818 g water, 17.3 g polyvinyl alcohol solution (5% active Vinol #540), 30 g tricalcium phosphate and 62.5 g polystyrene beads of 35-50 mesh size. The weight average molecular weight (Mw) of the polystyrene was 299,000. The slurry was heated, with stirring at 220 rpm, to 70° C. A comonomer solution (I) was formed by mixing 1350 g styrene, 150 g methacrylic acid and 0.6 g n-dodecylmercaptan. An emulsion (II) of (I) was prepared in a Polytron high intensity blender from 8 g (I), 59 g water, and 1.2 g of aqueous 5% polyvinyl alcohol (Vinol #540) and mixed for 10 minutes. The agitation speed of the bead slurry was increased to 300 rpm. The emulsion (II) was added over a period of 1.5 minutes and flushed with 15 ml of water into the reactor. After 10 minutes, 8 ml of (I) was added streamwise over a 10 minute period. Agitation was continued for 20 minutes while samples (~0.3 g) of slurry were taken to determine the stability of the dispersion. The test for stability consisted of dropping the sample into a 100 ml column of water and examining the diluted slurry for agglomerated beads. If the dispersion was free from agglomerated beads, an emulsion (III) of a solution of concentrated catalyst was then added. This emulsion (III) was formed by dissolving 7.5 g benzoyl peroxide and 0.7 g of t-butyl perbenzoate in 50 g comonomer blend (I) with mild stirring. The resultant solution then had added thereto 74 g water and 1.5 g aqueous polyvinyl alcohol (Vinol #540). This mixture was intensely mixed in a Polytron for 20 minutes to form the emulsion (III). While being agitated, the emulsion (III) was added continuously to the slurry at the following time/temperatures of the slurry:

15 minutes/70° C.
45 minutes/70°-90° C.
15 minutes/90° C.

Residual emulsion in its container was flushed into the reactor with 15 ml of water. The pumping of comonomer solution (I) into the reactor was then started at a rate of 3.6 ml/min. With the suspension maintained at 90° C., pumping was continued until 475 ml had been added. An additional 475 ml of (I) with 7.5 g of benzoyl peroxide and 0.7 g t-butyl perbenzoate dissolved therein was then added in a similar manner, i.e. at 3.6 ml/min. The total amount added was 937.5 g. Unreacted styrene in the beads sampled at this time was determined to be 2.5%. Heating was continued at 90° C. for an additional two hours at which time the unreacted styrene was 1.3%. After heating for two more hours at 90° C., the suspension was cooled to 35° C. and transferred in 200 ml portions to 12-ounce bottles. The bottles were purged with nitrogen, sealed with crown caps and rotated end-over-end in an oil bath heated to 135° C. over 1.5 hours and at 135° C. for 1.5 hours. After cooling to room temperature, the bottles were opened and the contents acidified to pH~1.0 with hydrochloric acid. The beads were separated and water-washed on a 100-mesh sieve. The beads were spherical, non-agglomerated and were within the proper size range, i.e. passing through a 16-mesh sieve and retained on a 30-mesh sieve, desired for molding of complex foam shapes from expandable beads. The amounts of unreacted monomers were sufficiently low (<0.03% styrene and 0.07% methacrylic acid) to avoid odor and heat softening problems. The melt index (i.e., g. of polymer collected in 10 minutes through a standard orifice at 230° C. by ASTM method D-1238, condition L) was determined to be 21.0.

To render the beads, from the series of examples, expandable, aliquots thereof were impregnated by n-pentane and/or n-hexane in 12 oz. bottles heated at 90° C. for two hours and at 110° C. for six hours according to the following formulations:

100 g of beads of 90/10 styrene-methacrylic acid copolymer formed on polystyrene (6.25%) initial beads
100 g water
2.0 g tricalcium phosphate
0.05 g dodecylbenzene sodium sulfonate
0.60 g Surfonic N-300 (Texaco Chemical Co.)
X g n-pentane
Y g n-hexane The impregnated beads were acidified with hydrochloric acid, centrifuged, water-rinsed, tray-dried until free-flowing, and sealed in crown-capped bottles. Six days later, the beads were expanded in steam at atmospheric pressure for two minutes. The expanded beads were then moistened and molded in ½"×2"×2" cavities in a compression press at 290° F. The following results were obtained:

| Aliquot | A | B | C | D | E |
|---|---|---|---|---|---|
| Blowing Agent Charge[a] | | | | | |
| X = n-Pentane g. | 7.5 | 5.9 | 4.1 | 2.1 | 0.0 |
| Y = n-Hexane g. | 0.0 | 2.0 | 4.1 | 6.3 | 8.7 |
| Bead Volatile Content % | 6.9 | 7.2 | 7.5 | 8.1 | 8.4 |
| Bulk Density of Expanded Beads, lb./ft.$^3$ | 7.4 | 5.3 | 4.1 | 2.3 | 1.8 |
| Consecutive oven aging Tests of Molded Foams | | | | | |
| 24 hrs/105° C. | | | | | |
| Wt. change % | −0.45 | −0.57 | 0.00 | −2.26 | −2.86 |
| Vol. change % plus | +0.64 | 0.00 | −0.64 | −1.83 | −2.03 |
| 24 hrs/110° C. | | | | | |
| Wt. change % | 0.0 | −0.86 | −0.49 | 0.00 | −1.47 |
| Vol. change % plus | 0.0 | 0.00 | −0.65 | −0.80 | −1.38 |
| 24 hrs/115° C. | | | | | |
| Wt. change % | −0.23 | −0.29 | 0.00 | 0.00 | 0.00 |
| Vol. change % | −1.27 | −2.60 | −3.25 | −1.61 | −1.29 |
| Total Weight change % | −0.68 | −1.72 | −0.49 | −2.26 | −4.33 |
| Total Volume change % | −0.63 | −2.60 | −4.54 | −4.24 | −4.70 |

[a]Each charge of hydrocarbon is the same on a molar basis.

These data show that foams of excellent heat resistance (<1% volume shrinkage when heated for consecutive days at 105°, 110° and 115° C.) were obtained with n-pentane as the sole blowing agent. Blowing agents comprising 25/75 and 50/50 mixtures of n-hexane and n-pentane imparted enhanced expandability and bead-to-bead fusion but the foam shrinkage was greater (2.6 and 4.5%). Conventional n-pentane—containing polystyrene bead foams of 1.5 pcf density, after one day at 105° C., shrank at least 90% of their original volume.

EXAMPLE II

The process of Example I was repeated without the delayed addition of peroxides (i.e. no 7.5 g. benzoyl peroxide and 0.7 g. of t-butyl perbenzoate in the final charge of 475 ml of comonomer blend (I)), but the beads exhibited a very low melt index of 0.6, indicative of a high average molecular weight. These beads were impregnated with n-pentane and the beads expanded to a 3.7 pcf foam with a hard crust. Apparently, the surface polymer expanded poorly because of its excessively high molecular weight. In the heat resistance test, these hard crusts (retaining the blowing agent) expanded further and gave a blistered, alligator-like surface to the foam moldings. The total increase in volume was 7.2%.

EXAMPLE III

A bead charge of 250 g of polystyrene (Mw~299,000; screened through a 25-mesh sieve and onto a 40-mesh sieve) suspended in 818 g water, 30 g tricalcium phosphate and 17.3 g polyvinyl alcohol solution (5% active Vinol #540 in water) was agitated at 300 rpm and heated to 70° C. An emulsified mixture of 36 ml of styrene monomer, 1.2 g polyvinyl alcohol solution (5%) and 59 g water was added to the bead slurry over 1.5 min and flushed with 15 ml of water. After 10 minutes additional agitation, 26 ml of monomer was pumped into the slurry over 10 minutes. The total mix was held at 70° C. for an additional 20 minutes while testing the dispersion to assure the absence of agglomerated beads. A concentrated solution of catalysts (1,875 g benzoyl peroxide and 0.5625 g t-butyl perbenzoate) and tert-dodecyl mercaptan (0.6 g) in styrene (43 ml) was emulsified with a solution of 1.5 g of aqueous polyvinyl alcohol (5% Vinol #540) in 73.5 ml of water and then added to the bead slurry over 2 minutes. The resultant slurry was then held at 70° C. for 1.25 hours. An 88/12 mixture of styrene and methacrylic acid was then slowly added via a metering pump so that 180 ml was added over one hour while heating the slurry from 70° C. to 90° C. The comonomer addition rate was then increased to 218 ml per hour and continued until a total of 710 g had been added. The bead slurry was heated another 4 hours at 90° C., then cooled to 30°–35° C. The slurry was then transferred in 200 g portions, along with 2 g of tricalcium phosphate, to 12 oz. bottles and heated for 1.5 hours at 135° C.

The beads were recovered as in Example I. Deposition of the copolymer was very uniform as indicated by the bead size (16–25 mesh) and the minimal co-generation of through 25-mesh fines (0.22%). The unreacted monomers amounted to 0.21% styrene and 0.02% methacrylic acid. The n-pentane impregnated beads (7.4% volatile content) expanded to 7.4 pcf in 2 minutes in steam at atmospheric pressure. Foam specimens (2"×2"×½" plaques molded at 290° F.) exposed to 105° C. for 24 hours increased in volume by 13.8%. The poor heat resistance (i.e. bloating) of the foams is attributed to the excessive amount (25%) of initial polystyrene seed beads.

EXAMPLE IV

The process of Example II was repeated except that 250 g of unimpregnated beads prepared in Example III were used in place of polystyrene beads as the initial seed beads. Thus, the final product contained 6.25% of polystyrene. The beads were characterized as follows: copolymerized methacrylic acid~12% (by infrared analysis); unreacted styrene—0.43%; and unreacted methacrylic acid—0.03%. The beads were spherical and within 10–20 mesh in size. The amount of cogenerated fines was 0.74%. Impregnated with n-pentane (6.8%), the beads expanded in steam to foam of 9.2 pcf bulk density. Moldings exhibited much improved heat resistance. At 105° C. for 24 hours, the foams shrank 0.63% (Polystyrene foams of 1.5 pcf density shrink at least 90%). Elevating the temperature to 110° C. for 24 more hours effected no additional volume change. After heating at 115° C. for 24 additional hours the foams shrank 0.32% further. Thus, the total volume shrinkage was only 0.95%.

We claim:

1. A process for forming coated styrenic polymer beads for use in producing heat resistant foamed articles comprising:
   (a) forming an aqueous suspension of initial styrenic polymer beads with the aid of a finely divided difficultly water-soluble inorganic phosphate suspending agent and a polyvinyl alcohol suspending agent;
   (b) forming a comonomer solution of a styrenic monomer, methacrylic acid, and a polymerization regulator;
   (c) adding a minor portion of the comonomer solution to the styrenic polymer bead suspension to soften the beads;
   (d) forming an emulsion comprising aqueous polyvinyl alcohol and a minor portion of said comonomer solution with free-radical-producing peroxidic catalysts dissolved therein;
   (e) adding the emulsion to the styrenic polymer bead suspension at 60°–75° C. to form a mixture thereof and heating the same to a polymerization temperature of about 90° C.;
   (f) adding the remainder of said comonomer solution to said mixture at said polymerization temperature, and maintaining the mixture at said temperature to polymerize said comonomers; and
   (g) heating said mixture to a temperature of 115° to about 135° C. to substantially complete the polymerization of said styrenic monomer and methacrylic acid.

2. The process as defined in claim 1 wherein free-radical-producing catalysts are dissolved in a portion of the remainder of said comonomer solution prior to the addition thereof to said mixture.

3. The process as defined in claim 1 or 2 wherein said initial styrenic polymer beads are produced from at least 50% of a styrenic monomer selected from the group consisting of styrene, alpha-methylstyrene, para-methylstyrene, para-t-butyl—styrene, monochlorostyrene and dichlorostyrene.

4. The process as defined in claim 1 or 2 wherein said styrenic monomer is selected from the group consisting of styrene, alpha-methylstyrene, para-methylstyrene, para-t-butyl—styrene, monochlorostyrene and dichlorostyrene.

5. The process as defined in claim 1 or 2 wherein the coating formed about said initial beads comprises 80–97% by weight of the beads so produced.

6. The process as defined in claim 1 or 2 wherein the coating formed about said beads comprises from 83–95% by weight of said styrenic monomer and 5–17% by weight of said methacrylic acid.

7. The process as defined in claim 1 or 2 wherein said polymerization regulator is selected from the group consisting of n-dodecylmercaptan, tertiary-dodecylmercaptan and mixtures thereof.

8. The process as defined in claim 1 or 2 wherein said free-radical-producing peroxidic catalysts are soluble in styrene and the primary catalyst is selected from a group with a 10-hour half-life temperature of 60° to 80° C. and the secondary catalyst is selected from a group with a half-life temperature of 95° to 110° C.

9. A process for forming coated styrene polymer beads for use in producing heat resistant foamed articles comprising:
   (a) forming an aqueous suspension of initial polystyrene beads with the aid of a finely divided difficultly water-soluble inorganic phosphate suspending agent and a polyvinyl alcohol suspending agent;
   (b) forming a comonomer solution of styrene, methacrylic acid, and a polymerization regulator;
   (c) adding a minor portion of the comonomer solution to the polystyrene bead suspension to soften the beads;
   (d) forming an emulsion comprising aqueous polyvinyl alcohol and a minor portion of said comonomer solution with free-radical-producing catalysts dissolved therein;
   (e) adding the emulsion to the polystyrene bead suspension at 60°–75° C. to form a mixture thereof and heating the same to a polymerization temperature of about 90° C.;
   (f) adding the remainder of said comonomer solution to said mixture at said polymerization temperature, and maintaining the mixture at said temperature to polymerize said comonomers; and
   (g) heating said mixture to a temperature of 115° to about 135° C. to substantially complete the polymerization of said styrene and methacrylic acid.

10. The process as defined in claim 9 wherein free-radical-producing catalysts are dissolved in a portion of the remainder of said comonomer blend prior to addition thereof to said mixture.

* * * * *